April 5, 1927.  
V. VIVAUDOU  
1,623,509
COSMETIC CONTAINER
Filed April 6, 1923
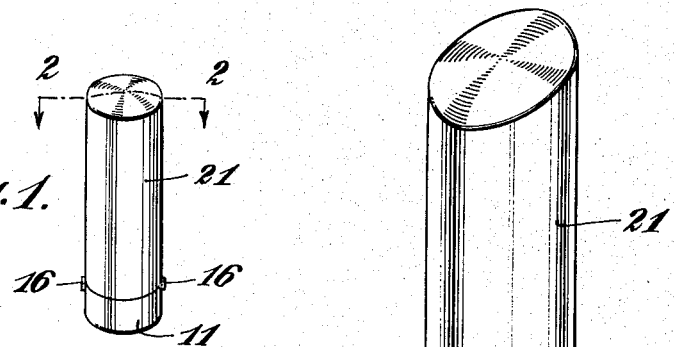
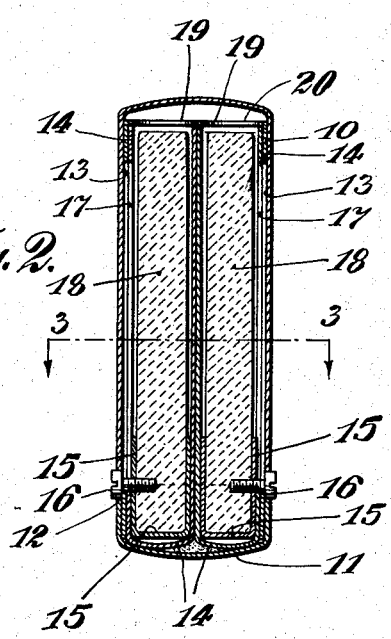
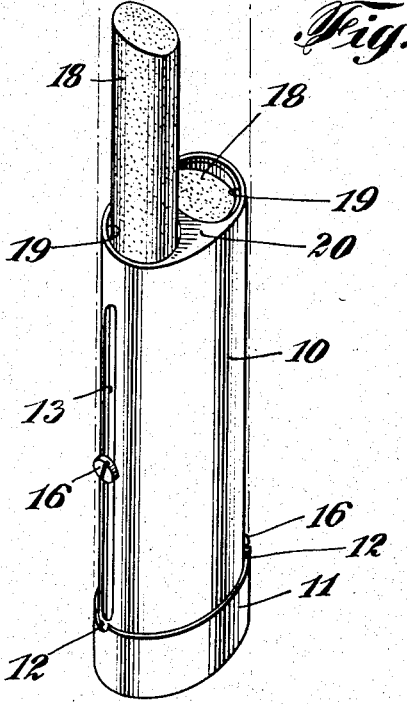
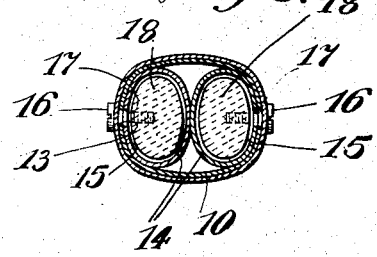
INVENTOR  
Victor Vivaudou  
BY  
ATTORNEY Patented Apr. 5, 1927.                                                1,623,509

UNITED STATES PATENT OFFICE.

VICTOR VIVAUDOU, OF NEW YORK, N. Y.

COSMETIC CONTAINER.

Application filed April 6, 1923. Serial No. 630,274.

My invention relates to cosmetic containers and refers particularly to containers suitable for use with a plurality of cosmetic pencils.

The object of my invention is a container adapted to contain and carry a plurality of cosmetic pencils, such as eyebrow pencils and lip sticks, in such a manner that they will be hygienically and safely protected when not in use, but which can be readily and easily exposed for purposes of use.

My device comprises a casing within which are a number of cosmetic pencils, or sticks, readily exposable for use, as desired, the means of exposure being an element passing through the casing and movable from the exterior thereof.

The cosmetic pencils of my device, while movable therein, are fixedly attached to a moving means incapable of separation from the casing, and hence, the pencils can not be accidentally separated therefrom, thus preventing the danger of breakage and loss.

As the cosmetic pencils of my device need not be removed from their casings for exposure for use, it is evident that it possesses operative advantages over devices in which the pencil must be entirely removed from the casing for use with the incident trouble and danger to the pencil during its insertion into the casing after use.

A consideration of my specification and the accompanying drawings will indicate the advantages and usefulness of my device for the purposes mentioned.

In the accompanying drawings, illustrating one form of the device of my invention, similar parts are designated by similar numerals.

Figure 1 is a perspective view of one form of my device in closed position.

Figure 2 is a section through the line 2—2 of Figure 1.

Figure 3 is a section through the line 3—3 of Figure 2.

Figure 4 is a perspective view of the device in open position with one cosmetic pencil in exposed position for use.

The particular form of the device of my invention, shown in the accompanying drawings, comprises a lower casing composed of a side member 10, having the lower extended bottom member 11 with oppositely opposed recesses 12, 12 and oppositely opposed elongated openings 13, 13.

Fixedly carried by the lower casing are two pencil carriers 14, 14, the carriers being attached to each other and to the inner face of the casing by means of solder or otherwise.

Within each pencil carrier is a pencil base 15, slidable within the carrier and having an extended pin 16 passing through the aligned slots 17 of the carrier 14 and 13 of the casing 10.

Within each pencil base 15, and fixedly attached thereto, is a cosmetic pencil, or stick, 18, the two pencils being preferably different, as, for instance, an eyebrow pencil and a lip stick.

The two pencils are movable through the openings 19, 19 of the casing cover 20.

A cover 21 having opposed recesses 22, 22 is slidable over the casing, the pins 16, 16 being capable of being positioned within the recesses 22, 22.

The operation of the device is as follows:—

The device in closed position is shown in Figures 1, 2 and 3, the two pencils 18, 18 being protected within the casing and the cover 21 positioned over the casing.

When it is desired to employ the device, the cover 21 is removed and the desired pencil exposed by moving its pin 16 upwardly.

The exposed pencil may be withdrawn into the casing by moving the pin 16 downwardly before replacing the cover 21, or the cover may be used for this purpose, as the pin 16 will engage a recess 22 and move the pencil downwardly as the cover is moved downwardly.

It will thus be seen that the device of my invention possesses many advantages, among which are its hygienic protection of the pencils, the elimination of all danger of losing the pencils or of their becoming accidentally separated from the casing, its compactness, efficiency and economy.

I do not limit myself to the particular size, shape, number or arrangements of parts, as disclosed in the drawings and specification, as these are used simply as references for the clear description of the device of my invention.

What I claim is:—

In a cosmetic container, in combination, a casing having a plurality of longitudinal slots closed at the upper ends preventing the outward passage of pencil carriers, a plurality of pencil carriers in fixed position within the casing each carrier having a longitudinal slot in alignment with a casing slot, a longitudinally movable pencil base within each carrier, means carried by each base and passing through the aligned slots whereby the base may be moved longitudinally within the carrier, a cosmetic pencil fixedly attached to each base and a cover for the casing, the placement of which upon the casing will cause the pencils to be moved downwardly within the carriers.

Signed at New York in the county of New York and State of New York, this 2d day of April, 1923.

VICTOR VIVAUDOU.